United States Patent Office 3,236,922
Patented Feb. 22, 1966

3,236,922
PROCESS FOR THE PREPARATION OF URANIUM MONOCARBIDE-PLUTONIUM MONOCARBIDE FUEL ELEMENTS
Jim Woolford Isaacs and Michael Palreyman, Harwell, England, assignors to United Kingdom Atomic Energy Authority, London, England
No Drawing. Filed Mar. 28, 1963, Ser. No. 268,541
Claims priority, application Great Britain, Apr. 2, 1962, 12,512/62
6 Claims. (Cl. 264—.5)

The present invention relates to the production of uranium-plutonium-carbon alloys, and more particularly to the production of a mixed uranium monocarbide-plutonium monocarbide alloy, such as is useful as a nuclear fuel material, particularly for fast reactors.

In the co-pending application U.S. Serial No. 53,634 there was disclosed a method of producing such alloys which resides essentially in inserting a compact of uranium, plutonium and graphite into a heated furnace and it is an object of the present invention to provide an improvement in or modification of the aforesaid method.

According to the present invention, there is provided a process for the production of a mixed uranium monocarbide-plutonium monocarbide alloy which comprises mixing together finely ground oxide-free uranium powder, carbon powder and relatively coarse plutonium monocarbide powder, cold-forming a compact of such mixture and rapidly heating the same by plunging it into a furnace heated to a temperature between 1000° C. and 1300° C.

It should be noted that the heat of reaction of the uranium with the carbon ensures that the temperature of the compact will rise above 1125° C., the melting point of uranium, so that thereafter the reaction proceeds in the liquid phase and sintering of the mixed carbides follows. If this rapid heating effect is not employed, then it appears necessary to effect the sintering at a much higher temperature if it is desired to achieve a density of 12.0 gm./cc.

The uranium metal is preferably ground to smaller than 50 microns and the carbon is preferably the ultrafine graphite powder sold under the trade description DAG 621 and which has a particle size below 1 micron. On the other hand, the plutonium monocarbide powder should be relatively coarse, for example having a particle size in excess of 152 microns and conveniently between 250 and 425 microns.

The atmosphere in the furnace is conveniently argon and may be passed over a tantalum getter to reduce the oxygen content to less than 10 p.p.m.; with an argon atmosphere the furnace should be heated to 1100 and 1300° C. If a vacuum furnace is used the temperature may be between 1000° C. and 1150° C.

*Example*

An experiment was carried out using 95.2 gms. of uranium metal of size smaller than 50 microns and 4.80 gms. of the fine graphite powder DAG 621, i.e. in the stoichiometric proportions, and 17.65 gms. of plutonium monocarbide (corresponding to 15 atomic percent plutonium in uranium) were added, the particle size being approximately 295 microns. The mixture was cold pressed at 60 tons/sq. in. and the compacts loaded into molybdenum boats. After treatment for one hour in the furnace in an atmosphere of argon at 1200° C., the sintered bulk density was 12.5 gm./cc. corresponding to 92% theoretical.

It should be emphasized that it is important that the uranium be substantially oxygen free and to this end the powder may be worked in dilute nitric acid.

The invention also includes alloys when made by the process of the present invention.

We claim:

1. A process for the production of a mixed uranium monocarbide plutonium monocarbide alloy which comprises the sequential steps of:
   (a) mixing together finely ground, oxide-free, uranium powder, carbon powder and relatively coarse plutonium monocarbide powder;
   (b) cold compacting the mixture;
   (c) passing the compacted mixture into a sintering zone maintained at the time of passing of the mixture at a temperature within the range of about 1000° C.–1300° C.;
   (d) permitting the temperature of the compact in the sintering zone to rapidly rise for a short period of time, solely as a result of the exothermic heat generated by the reaction to a temperature in excess of the melting point of uranium metal;
   (e) and thereafter heating the mixture in the said sintering zone at a temperature in the range of about 1000–1300° C. for a period of time sufficient to effect a complete sintering of the mixture.

2. A process according to claim 1, wherein the uranium is ground to smaller than 50 microns.

3. A process according to claim 1, wherein the carbon powder is graphite having a particle size below 1 micron.

4. A process according to claim 1, wherein the plutonium monocarbide has a particle size in the range 250 to 425 microns.

5. A process according to claim 1, wherein the furnace atmosphere is argon and the temperature 1100 to 1300° C.

6. A process according to claim 1, wherein the reaction is effected in vacuo at a furnace temperature of 1000 to 1150° C.

References Cited by the Examiner
UNITED STATES PATENTS

| | | | |
|---|---|---|---|
| 2,569,225 | 9/1951 | Carter et al. | 23—14.5 |
| 2,807,542 | 9/1957 | Frank | 75—214 |
| 3,011,960 | 12/1961 | Williams et al. | 23—14.5 |
| 3,051,566 | 8/1962 | Schwartz | 75—213 |

OTHER REFERENCES

AEC Report NDA–2140–2, June 13, 1960, pp. 31, 44, 46, and 48.

CARL D. QUARFORTH, *Primary Examiner.*
REUBEN EPSTEIN, *Examiner.*